(12) United States Patent
Park et al.

(10) Patent No.: US 9,696,848 B2
(45) Date of Patent: Jul. 4, 2017

(54) TOUCH-SENSITIVE DISPLAY DEVICE

(71) Applicant: SAMSUNG DISPLAY CO., LTD., Yongin-si, Gyeonggi-Do (KR)

(72) Inventors: Mi-Ae Park, Hwaseong-si (KR); Sung Ku Kang, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 15/244,254

(22) Filed: Aug. 23, 2016

(65) Prior Publication Data

US 2016/0357330 A1 Dec. 8, 2016

Related U.S. Application Data

(63) Continuation of application No. 14/314,960, filed on Jun. 25, 2014, now Pat. No. 9,430,108.

(30) Foreign Application Priority Data

Dec. 31, 2013 (KR) .................. 10-2013-0169244

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC ...... G06F 3/044; G06F 3/0412; G06F 3/0416; G06F 2203/04111; G06F 2203/04112; G06F 2203/04103; G06K 9/0002
USPC .................... 345/173–178; 178/18.01–18.11
See application file for complete search history.

(56) References Cited

U.S. PATENT DOCUMENTS

| | | | |
|---|---|---|---|
| 8,446,386 B2 | 5/2013 | Hamblin et al. |
| 2009/0141046 A1 | 6/2009 | Rathnam et al. |
| 2012/0105081 A1 | 5/2012 | Shaikh et al. |
| 2013/0135247 A1 | 5/2013 | Na et al. |
| 2014/0333328 A1 | 11/2014 | Nelson et al. |
| 2015/0177884 A1 | 6/2015 | Han |
| 2015/0185906 A1 | 7/2015 | Park et al. |

FOREIGN PATENT DOCUMENTS

| | | |
|---|---|---|
| KR | 10-2009-0122586 | 12/2009 |
| KR | 10-2012-0138887 | 12/2012 |
| KR | 10-2013-0044432 | 5/2013 |

*Primary Examiner* — Dmitriy Bolotin
(74) *Attorney, Agent, or Firm* — F. Chau & Associates, LLC

(57) ABSTRACT

A touch-sensitive display device is provided. The touch-sensitive display device includes a touch sensing unit and a display panel. A plurality of sensing electrodes is formed in the touch sensing unit. A plurality of driving electrodes to which driving voltages are applied is formed in the display panel. The plurality of sensing electrodes is formed in predetermined patterns on one side of the touch sensing unit, and the patterns of the plurality of sensing electrodes are different in a first sensing region and a second sensing region.

14 Claims, 10 Drawing Sheets

TOUCH-SENSITIVE DISPLAY DEVICE

CROSS-REFERENCE TO RELATED PATENT APPLICATION

This application is a Continuation of copending U.S. patent application Ser. No. 14/314,960, filed on Jun. 25, 2014, which claims priority under 35 U.S.C. §119 to Korean Patent Application No. 10-2013-0169244 filed on Dec. 31, 2013 in the Korean Intellectual Property Office, the disclosures of which are incorporated by reference herein in their entirety.

TECHNICAL FIELD

The present invention relates to a display device, and more particularly, to a touch-sensitive display device.

DISCUSSION OF THE RELATED ART

A capacitive touch sensing unit has been developed having high durability, short reaction time, and high transmissivity.

Many capacitive touch sensing units may utilize stylus devices to aid a user in providing touch inputs to the touch sensing unit. These styluses may include a conduct rod that sits at the end of the stylus for making contact with the touch sensing unit. The conductive rods may have a diameter of about 6 mm or more. However, as the size of the conductive rod gets smaller, for example, where the diameter of the conductive rod is 2 mm or less, a size of a unit sensor node in the touch sensing unit may be decreased and the number of necessary sensing electrodes in the touch sensing unit may be increased. Thus, manufacturing of a sensor and a driving circuit in the touch sensing unit may be limited.

SUMMARY

According to an exemplary embodiment of the present invention, a touch-sensitive display device is provided. The touch-sensitive display device includes a touch sensing unit and a display panel. The touch sensing unit includes a plurality of sensing electrodes. The display panel includes a plurality of driving electrodes to which driving voltages are applied. The plurality of sensing electrodes is formed in predetermined patterns on one side of the touch sensing unit, and a pattern of the plurality of sensing electrodes in a first sensing region is different from that of the plurality of sensing electrodes in a second sensing region.

In an embodiment of the present invention, the plurality of sensing electrodes may include a plurality of first electrodes and a plurality of second electrodes. The plurality of first electrodes may be extended in a first direction and may be configured to sense a touch signal. The plurality of second electrodes may be extended in a second direction crossing the first direction and may be configured to receive the touch signal and to transmit the received touch signal to a driving circuit.

In an embodiment of the present invention, about two hundred first electrodes and about two hundred second electrodes are formed per unit area of 9 cm² in the first sensing region.

In an embodiment of the present invention, pitches between the plurality of second electrodes in the first sensing region may be smaller than pitches between the plurality of second electrodes in the second sensing region. The plurality of second electrodes may be disposed in a plurality of circular shapes or a plurality of oval shapes in the first sensing region. The plurality of first electrodes may be disposed in directions crossing the directions of the plurality of second electrodes such that the plurality of first electrodes and the plurality of second electrodes may be substantially orthogonal in portions of the first sensing region.

In an embodiment of the present invention, pitches between the plurality of first electrodes in the first sensing region may be smaller than pitches between the plurality of first electrodes in the second sensing region. The plurality of first electrodes may be disposed in a plurality circular shapes or a plurality of oval shapes in the first sensing region, and pitches between the plurality of first electrodes may be smaller than pitches in the second sensing region. The plurality of second electrodes may be disposed in directions crossing the directions of the plurality of first electrodes such that the plurality of first electrodes and the plurality of second electrodes may be substantially orthogonal in portions of the first sensing region.

In an embodiment of the present invention, about five first electrodes and about five second electrodes may be formed per unit area of 9 cm² in the second sensing region.

In an embodiment of the present invention, the first sensing region may be configured to recognize a conductive rod having a diameter of about 2 mm, or a unique pattern of fingerprint.

In an embodiment of the present invention, the second sensing region may be configured to recognize a conductive rod having a diameter of about 6 mm.

In an embodiment of the present invention, a total number of the first electrodes and the second electrodes in the touch sensing unit may be maintained when a number of first sensing regions is changed.

According to an exemplary embodiment of the present invention, a touch sensing unit is provided. The touch sensing unit includes a plurality of first electrodes and a plurality of second electrodes, a first sensing region, and a second sensing region. The first electrodes are extended in a first direction and are configured to sense a touch signal. The second electrodes are extended in a second direction crossing the first direction and are configured to receive the touch signal to transmit the received touch signal to a driving circuit. Patterns of the plurality of first electrodes are different from each other in the first sensing region and the second sensing region. Patterns of the plurality of second electrodes are different from each other in the first sensing region and the second sensing region.

In an embodiment of the present invention, pitches between the plurality of second electrodes in the first sensing region may be smaller than pitches between the plurality of second electrodes in the second sensing region. The plurality of second electrodes may be disposed in a plurality circular shapes or a plurality of oval shapes in the first sensing region.

In an embodiment of the present invention, pitches between the plurality of first electrodes in the first sensing region may be smaller than pitches between the plurality of first electrodes in the second sensing region. The plurality of first electrodes may be disposed in a plurality circular shapes or a plurality of oval shapes in the first sensing region.

In an embodiment of the present invention, about two hundred first electrodes and about two hundred second electrodes may be formed per unit area of 9 cm² in the first sensing region.

In an embodiment of the present invention, the first sensing region may be configured to recognize a conductive rod having a diameter of about 2 mm, or a unique pattern of a fingerprint.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
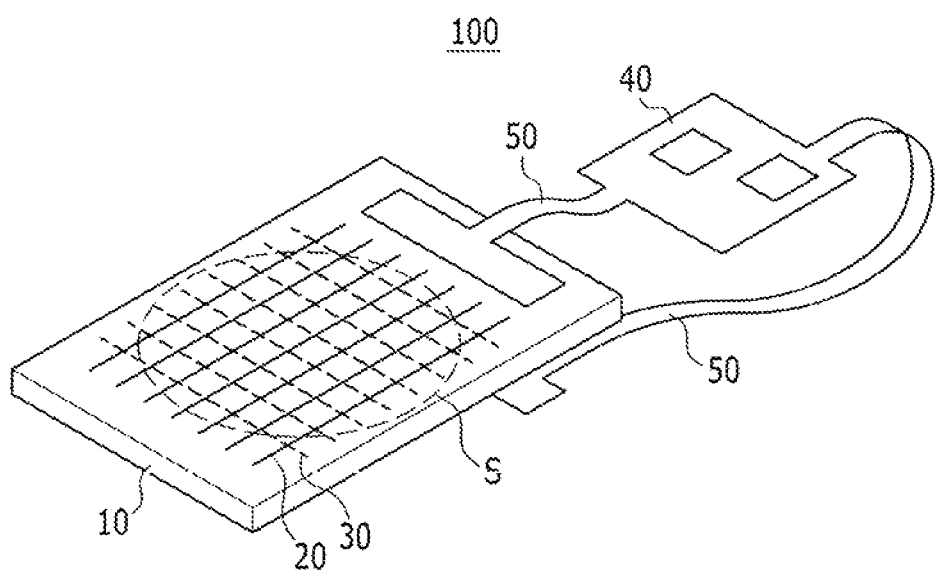
FIG. 1 is a diagram illustrating a touch-sensitive display device according to an exemplary embodiment of the present invention.

The present invention will be described more fully hereinafter with reference to the accompanying drawings, in which exemplary embodiments of the present invention are shown. However, the present invention may be embodied in various forms without departing from the spirit or scope of the present invention.

The drawings are schematic, and might not be drawn to scale. Relative dimensions and ratios of portions in the drawings may be exaggerated or reduced in size for clarity. In addition, like structures, elements, or components may refer to like reference numerals throughout the specification and the drawings.

Hereinafter, touch patterns of a touch-sensitive display device according to an exemplary embodiment of the present invention will be described in detail with reference to FIGS. 1 and 2.

Figure 2:
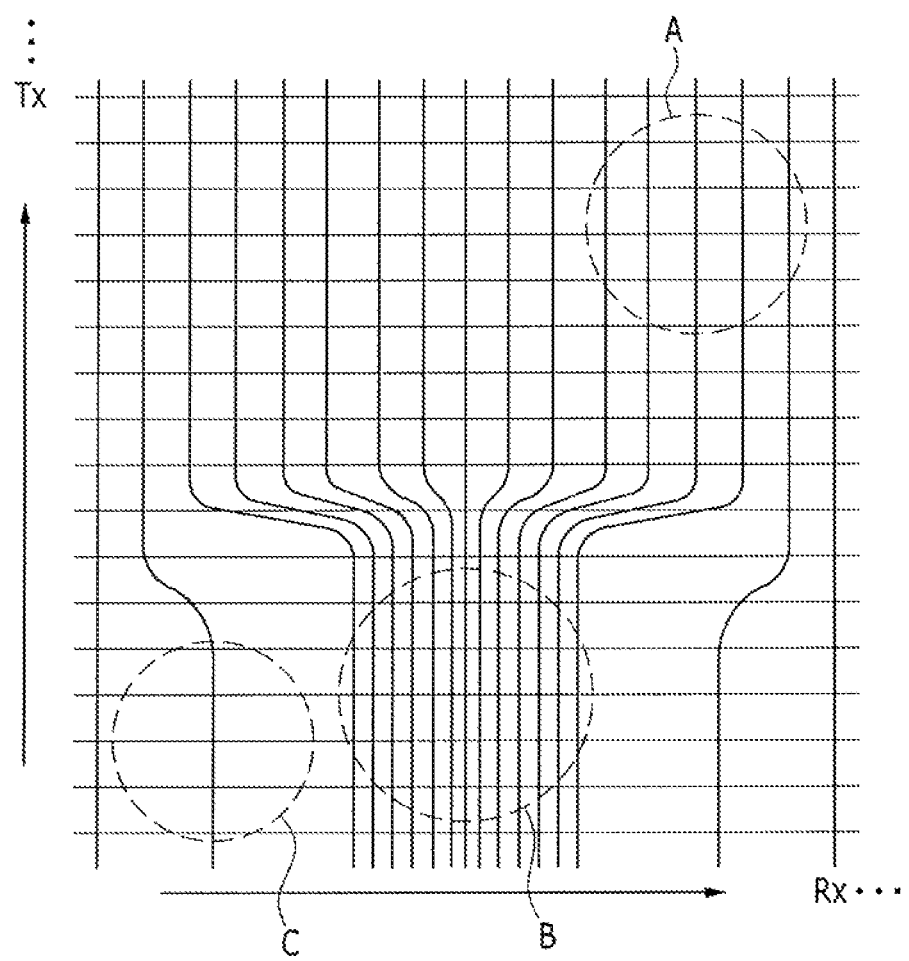
FIG. 2 is a diagram illustrating touch patterns of a touch-sensitive display device according to an exemplary embodiment of the present invention.

FIG. 1 is a diagram illustrating a touch-sensitive display device according to an exemplary embodiment of the present invention, and FIG. 2 is a diagram illustrating touch patterns of a touch-sensitive display device according to an exemplary embodiment of the present invention.

As illustrated in FIG. 1, a touch-sensitive display device 100 according to an exemplary embodiment of the present invention includes a touch sensing unit 10 in which a plurality of sensing electrodes is formed, and a display panel in which a plurality of driving electrodes to which driving voltages are applied is formed. In FIG. 1, the display panel is omitted, and the plurality of sensing electrodes is formed on the touch sensing unit 10 with predetermined patterns S. A flexible printed circuit board 40 is formed at one end of the touch sensing unit 10 by a connecting portion 50. A driving circuit chip (driving IC) may be mounted on the flexible printed circuit board 40. The connecting portion 50 may be bent to a rear side of the touch sensing unit 10 to be connected with the display panel.

A plurality of sensing electrodes having first electrodes Tx and second electrodes Rx may be formed on the touch sensing unit 10 with predetermined patterns. A plurality of sensing lines 20 and 30 of FIG. 1 may correspond to lines in which the first and second electrodes Tx and Rx are formed. The first electrodes Tx may sense a touch signal. The first electrodes Tx may be extended in a first direction. In addition, the second electrodes Rx may receive the touch signal to transmit the received touch signal to the driving circuit. The second electrodes may be extended in a second direction crossing the first direction.

As illustrated in FIG. 2, the touch sensing unit 10 may include a minute sensing region B, a simple sensing region A, and a simple keypad region C. In addition, the minute sensing region B, the simple sensing region A, and the simple keypad region C may have different touch patterns of the sensing electrodes Tx and Rx from each other.

For example, about two hundred first electrodes (e.g., from one hundred eighty first electrodes to two hundred twenty first electrodes) Tx and about two hundred second electrodes (e.g., from one hundred eighty second electrodes to two hundred twenty second electrodes) Rx crossing the first electrodes Tx may be formed in unit area of 9 cm$^2$ in the minute sensing region B. Further, about five first electrodes (e.g., from four first electrodes to six first electrodes) Tx and about five second electrodes Rx (e.g., from four second electrodes to six second electrodes) crossing the first electrodes Tx may be formed in unit area of 9 cm$^2$ in the simple sensing region A. The minute sensing region B in which about four hundred sensing electrodes Tx and Rx are formed may recognize a conductive rod having a diameter of about 2 mm (e.g., from 1.8 mm to 2.2 mm), or less. The simple sensing region A in which about ten sensing electrodes Tx and Rx are formed may recognize a conductive rod having a diameter of about 6 mm (e.g., from 5.5 mm to 6.5 mm), or more.

In touch patterns of a touch-sensitive display device according to an exemplary embodiment of the present invention, as illustrated in FIG. 2, pitches between the plurality of second electrodes Rx in the minute sensing region B may be smaller than pitches between the plurality of second electrodes Rx in the simple sensing region. A and the simple keypad region C, and thus, the number of sensor nodes per unit area may be increased. For example, in the minute sensing region B for recognizing a conductive rod having a minute diameter (e.g., about 2 mm) or a unique pattern of a fingerprint, the pitches between the second electrodes Rx may be decreased, and thus, the number of second electrodes Rx per unit area may be increased.

In the simple sensing region A, since minute sensing is not necessary, an original pattern (e.g., a pattern having larger pitches than the pitches in the minute sensing region B) may be formed and thus, the number of second electrodes Rx per unit area may be maintained.

In the simple keypad region C, a pattern having larger pitches than the pitches in the simple sensing electrodes A may be formed and thus, the number of second electrodes Rx per unit area may be decreased.

Accordingly, a total number of first electrodes Tx and second electrodes Rx may be maintained by varying the number of first electrodes Tx and second electrodes Rx according to a sensing region (e.g., minute sensing region B, simple sensing region A, keypad sensing region C) and thus, the number of sensor nodes may be maintained. Thus, minute sensing in the minute sensing region B may be achieved.

Figure 3:
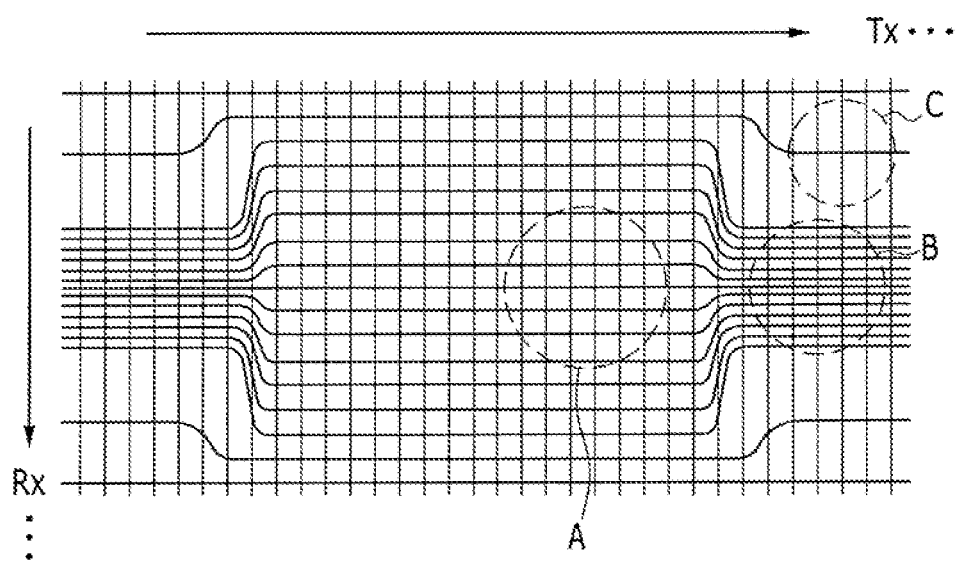
FIG. 3 is a diagram illustrating touch patterns of a touch sensing unit display device according to an exemplary embodiment of the present invention.

FIG. 3 is a diagram illustrating touch patterns of a touch-sensitive display device according to an exemplary embodiment of the present invention. As illustrated in FIG. 3, when two or more minute sensing regions are disposed on the touch sensing unit 10, the minute sensing regions B may be formed at both sides of the touch sensing unit 10. Like the patterns illustrated in FIG. 1, pitches between the plurality of second electrodes Rx in the minute sensing region B are smaller than pitches between the plurality of second electrodes Rx in the simple sensing region A and the simple keypad region C, and thus, the number of sensor nodes per unit area in the minute sensing region B may be increased.

In addition, when there are a plurality of minute sensing regions B on the touch sensing unit 10, a total number of first electrodes Tx and second electrodes Rx may be maintained by varying the number of first electrodes Tx and second electrodes Rx according to a sensing region (e.g., minute sensing region B, simple sensing region A, keypad sensing region C) and thus, the number of sensor nodes may be maintained. Thus, minute sensing in the plurality of minute sensing regions B may be achieved.

Figure 4:
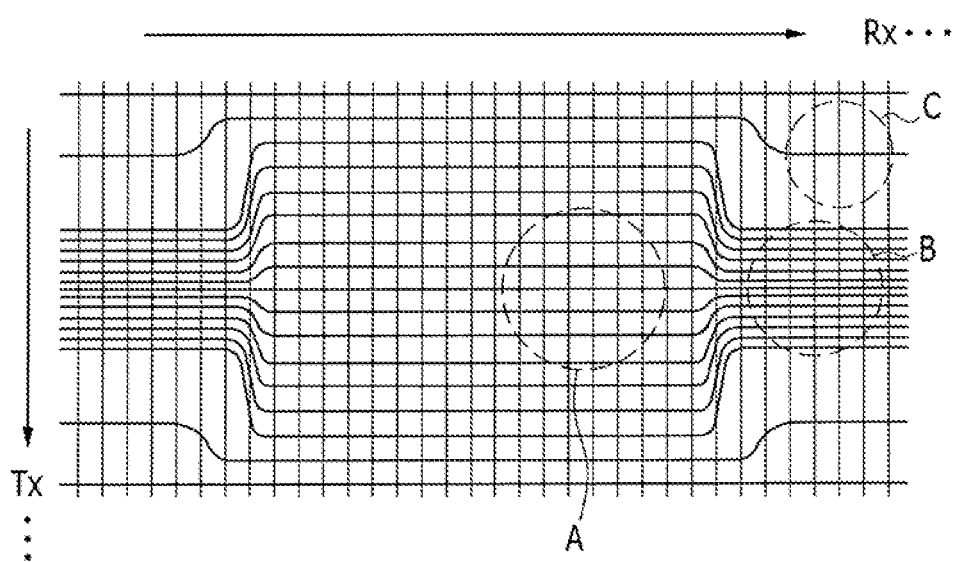
FIG. 4 is a diagram illustrating touch patterns of a touch-sensitive display device according to an exemplary embodiment of the present invention.

FIG. 4 is a diagram illustrating touch patterns of a touch-sensitive display device according to an exemplary embodiment of the present invention. The touch patterns illustrated in FIG. 4 is similar to the touch patterns illustrated in FIG. 3, but the sensing electrodes are different in that pitches between the plurality of plurality of first electrodes Tx in the minute sensing region B are smaller than pitches between the plurality of plurality of first electrodes Tx in the simple sensing region A and the simple keypad region C, and thus, the number of sensor nodes per unit area in the minute sensing region B may be increased. For example, the first electrodes Tx and the second electrodes Rx in FIG. 4 are positioned reversely to those in FIG. 3 to form the sensing electrode patterns.

Figure 5:
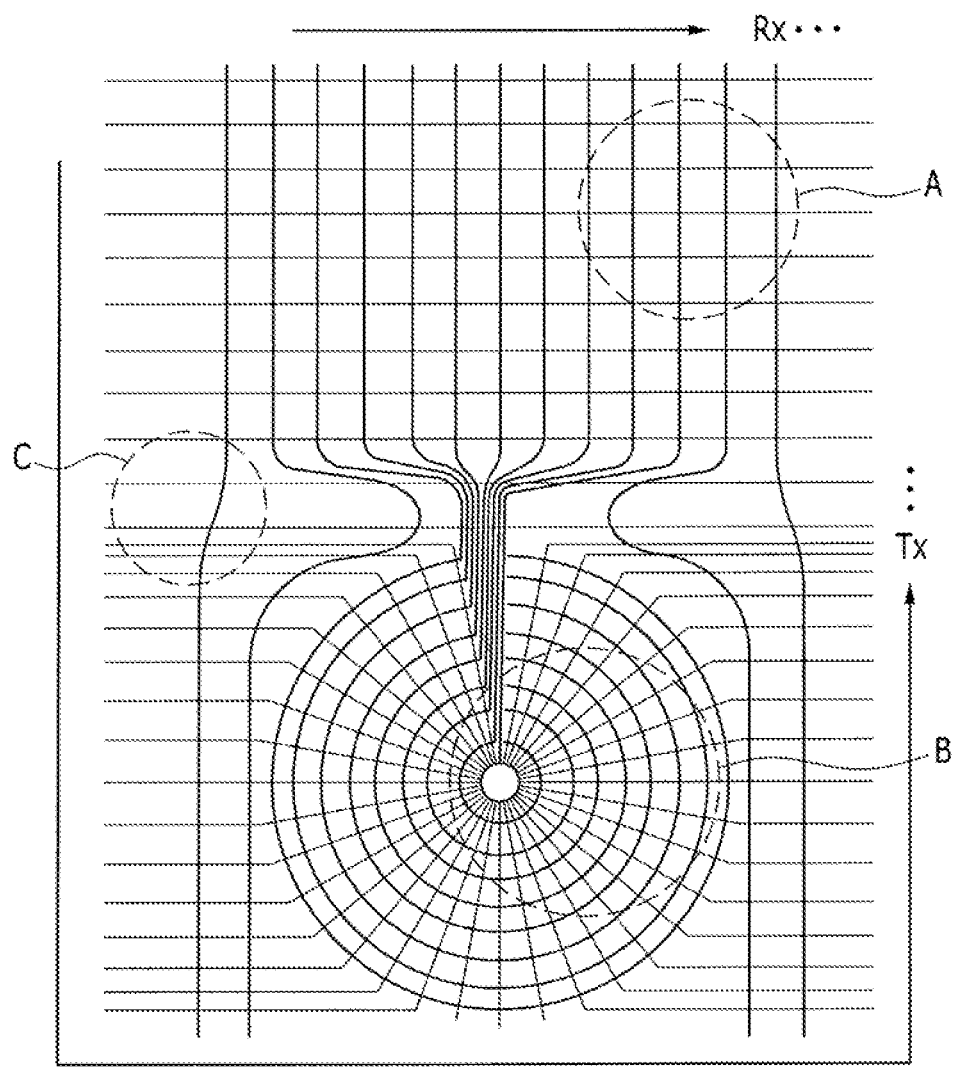
FIG. 5 is a diagram illustrating touch patterns of a touch-sensitive display device according to an exemplary embodiment of the present invention.

FIG. 5 is a diagram illustrating touch patterns of a touch-sensitive display device according to an exemplary embodiment of the present invention. As illustrated in FIG. 5, in the sensing electrodes Tx and Rx, a plurality of second electrodes Rx are disposed in a plurality of circular shapes in the minute sensing region B, and pitches between the plurality of second electrodes Rx in the minute sensing region B are smaller than pitches between the plurality of second electrodes Rx in the simple sensing region A and the simple keypad region C, and thus, the number of sensor nodes per unit area in the minute sensing region B may be increased. For example, in the simple sensing region A and the simple keypad region C, the plurality of second electrodes Rx is disposed in a plurality of substantially straight shapes extended in a first direction. In addition, in the minute sensing region B, the plurality of second electrodes Rx is disposed in a plurality of circular shapes having different diameters and the same center point. Further, in the simple sensing region A and the simple keypad region C, the plurality of first electrodes Tx may be disposed in a second direction crossing the first direction. In addition, in the minute sensing region B, the plurality of first electrodes Tx may be disposed in directions crossing the circular shapes, formed by the second electrodes Rx, with respect to the center point thereof. For example, the first electrodes Tx and the second electrodes Rx may be disposed to be substantially orthogonal to each other in portions of the minute sensing region B, the simple sensing region A, and the keypad sensing region C.

Thus, the number of sensor nodes per unit area on the touch sensing unit 10 illustrated in FIG. 5 may be higher than the number of sensor nodes per unit area in any one of the touch sensing unit 10 illustrated in FIGS. 2 to 4.

Figure 6:
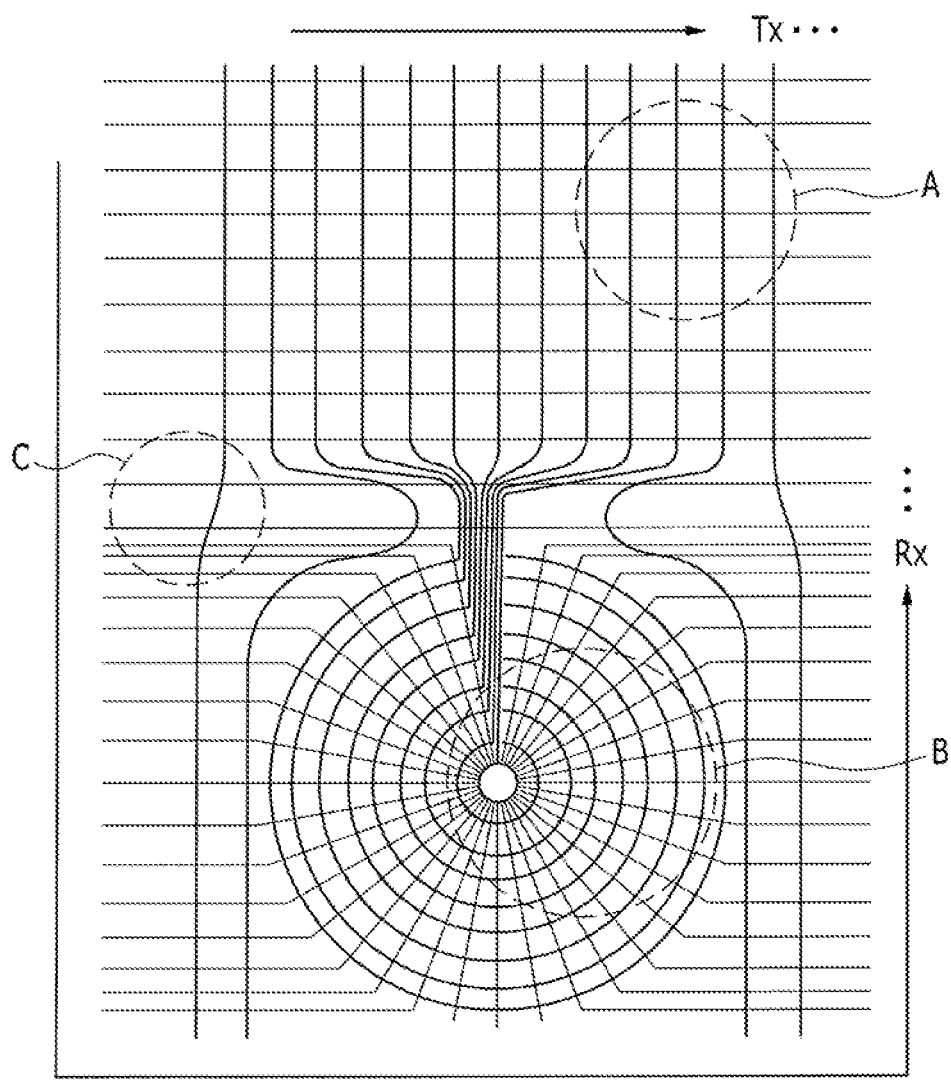
FIG. 6 is a diagram illustrating touch patterns of a touch-sensitive display device according to an exemplary embodiment of the present invention.

FIG. 6 is a diagram illustrating touch patterns of a touch-sensitive display device according to an exemplary embodiment of the present invention. The touch patterns illustrated in FIG. 6 is similar to the touch patterns illustrated in FIG. 5, but are different from the touch patterns illustrated in FIG. 5 in that the first electrodes Tx and the second electrodes Rx in FIG. 6 are positioned reversely to the first electrodes Tx and the second electrodes Rx in FIG. 5. For example, the plurality of first electrodes Tx is disposed in a plurality of circular shapes in the minute sensing region B, and pitches between the plurality of first electrodes Tx in the minute sensing region B are smaller than pitches between the plurality of first electrodes Tx in the simple sensing region A and the simple keypad region C, and thus, the number of sensor nodes per unit area in the minute sensing region B may be increased. For example, in the simple sensing region A and the simple keypad region C, the plurality of first electrodes Tx is disposed in a plurality of substantially straight shapes extended in a first direction. In addition, in the minute sensing region B, the plurality of first electrodes Tx is disposed in a plurality of circular shapes having different diameters and the same center point. Further, in the simple sensing region A and the simple keypad region C, the plurality of second electrodes Rx may be disposed in a second direction crossing the first direction. In addition, in the minute sensing region. B, the plurality of second electrodes Rx may be disposed in directions crossing the circular shapes, formed by the first electrodes Tx, with respect to the center point thereof. For example, the first electrodes Tx and the second electrodes Rx may be disposed to be substantially orthogonal to each other in portions of the minute sensing region B, the simple sensing region A, and the keypad sensing region C.

FIGS. 7 to 10 are diagrams illustrating touch patterns of minute sensing regions B of touch-sensitive display devices according to an exemplary embodiment of the present invention.

The touch patterns illustrated in FIGS. 7 to 10 are different from the touch patterns illustrated in FIGS. 2 to 6 in that in the minute sensing region, the plurality of second electrodes Rx or the plurality of first electrodes Tx is disposed in a plurality of oval shapes.

Figure 7:
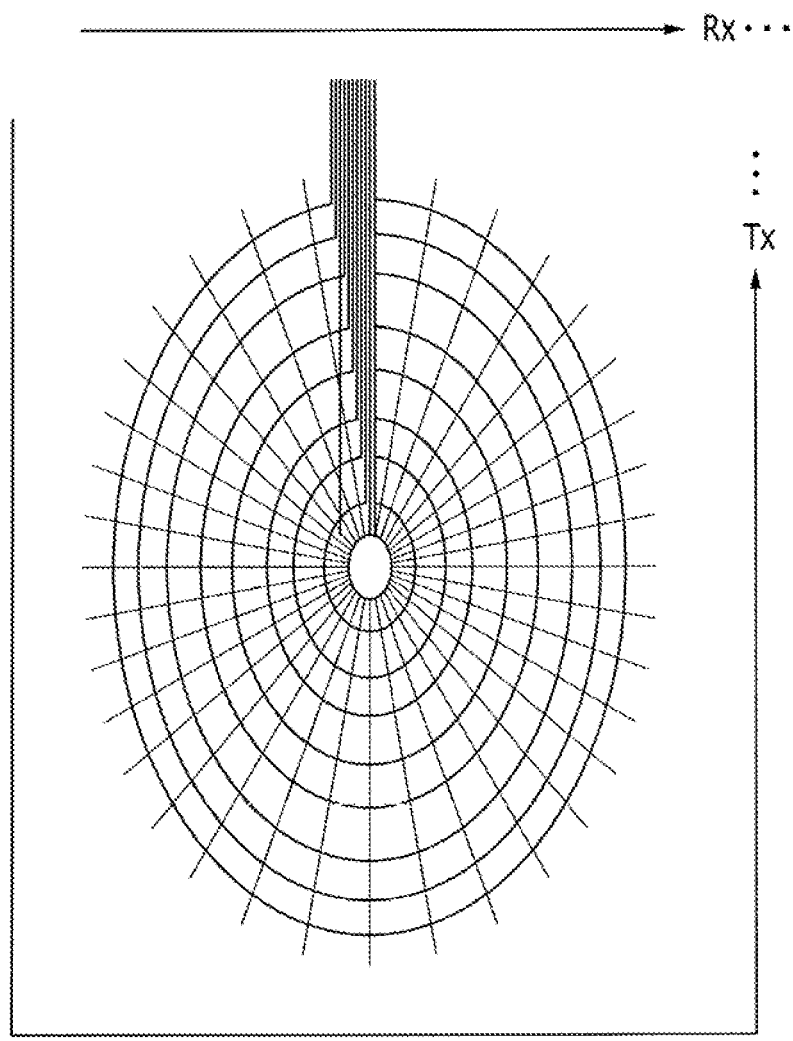
FIG. 7 is a diagram illustrating touch patterns of a minute sensing region of a touch-sensitive display device according to an exemplary embodiment of the present invention.
Figure 8:
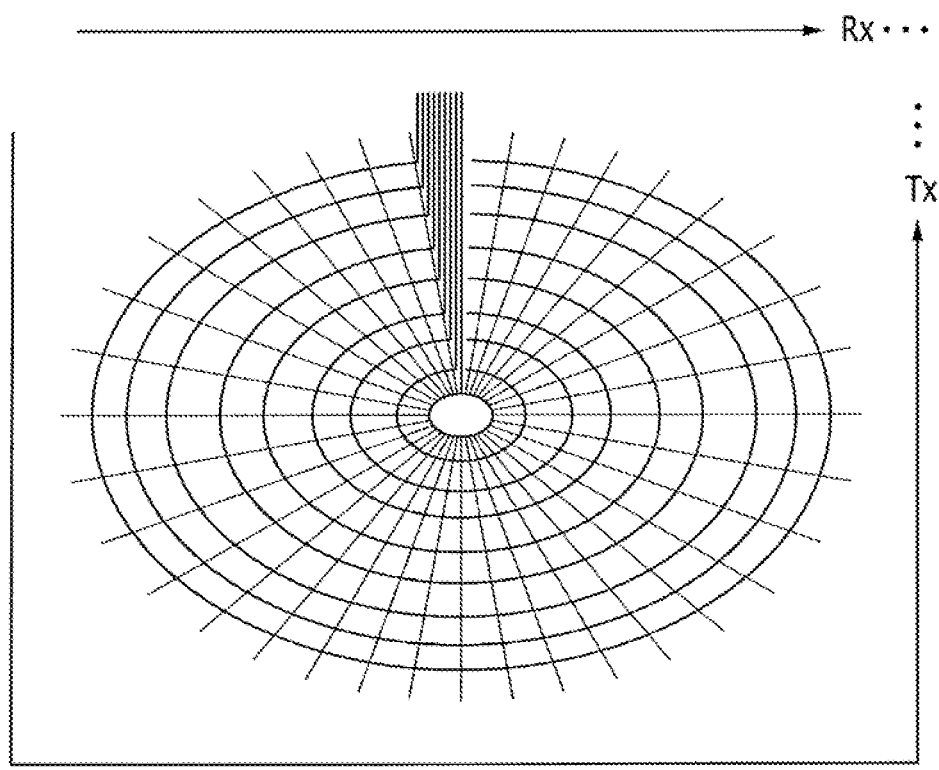
FIG. 8 is a diagram illustrating touch patterns of a minute sensing region of a touch-sensitive display device according to an exemplary embodiment of the present invention.

As illustrated in FIGS. 7 and 8, in the sensing electrodes, the plurality of second electrodes Rx is disposed in a plurality of oval shapes each of which having different diameters and the same center point in the minute sensing region B and thus pitches between the plurality of second electrodes Rx in the minute sensing region B are smaller than pitches between the plurality of second electrodes Rx in the simple sensing region A and the simple keypad region C. Thus, the number of sensor nodes per unit area in the minute sensing region B may be increased. In addition, in the minute sensing region B, the plurality of first electrodes Tx may be disposed in directions crossing the oval shapes, formed by the second electrodes Rx, with respect to the center point thereof. The plurality of oval shapes may have longer lengths than widths as illustrated in FIG. 7, and the plurality of oval shapes may have longer widths than lengths as illustrated in FIG. 8.

Figure 9:
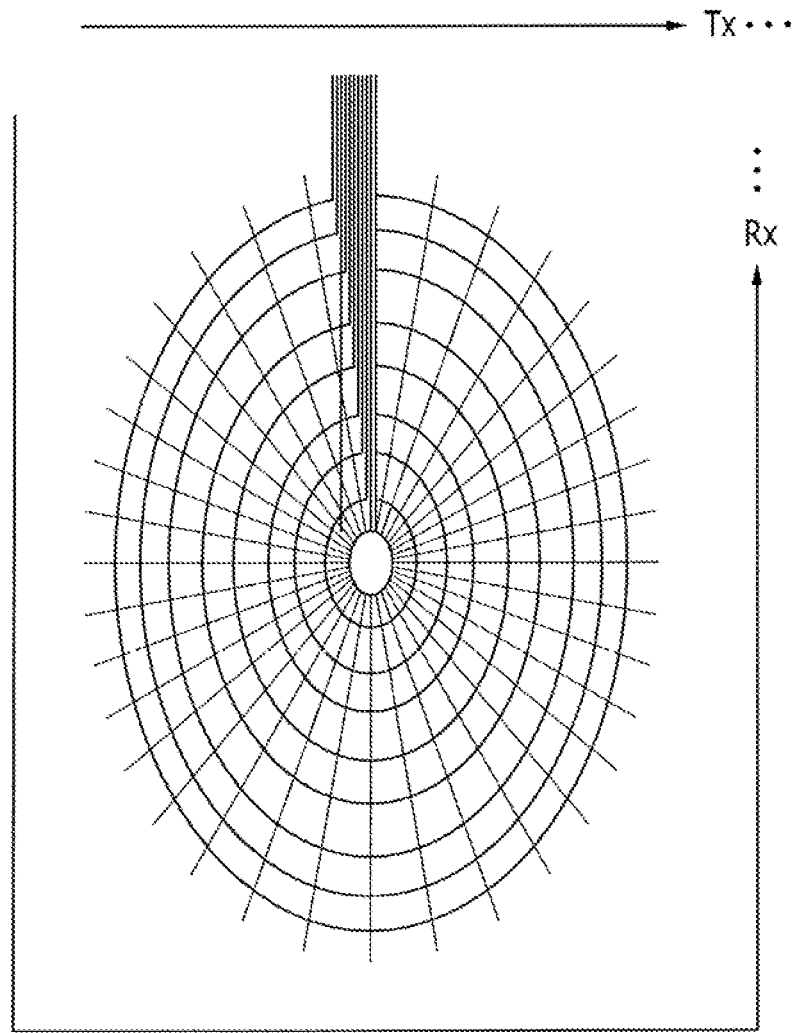
FIG. 9 is a diagram illustrating touch patterns of a minute sensing region of a touch-sensitive display device according to an exemplary embodiment of the present invention.
Figure 10:
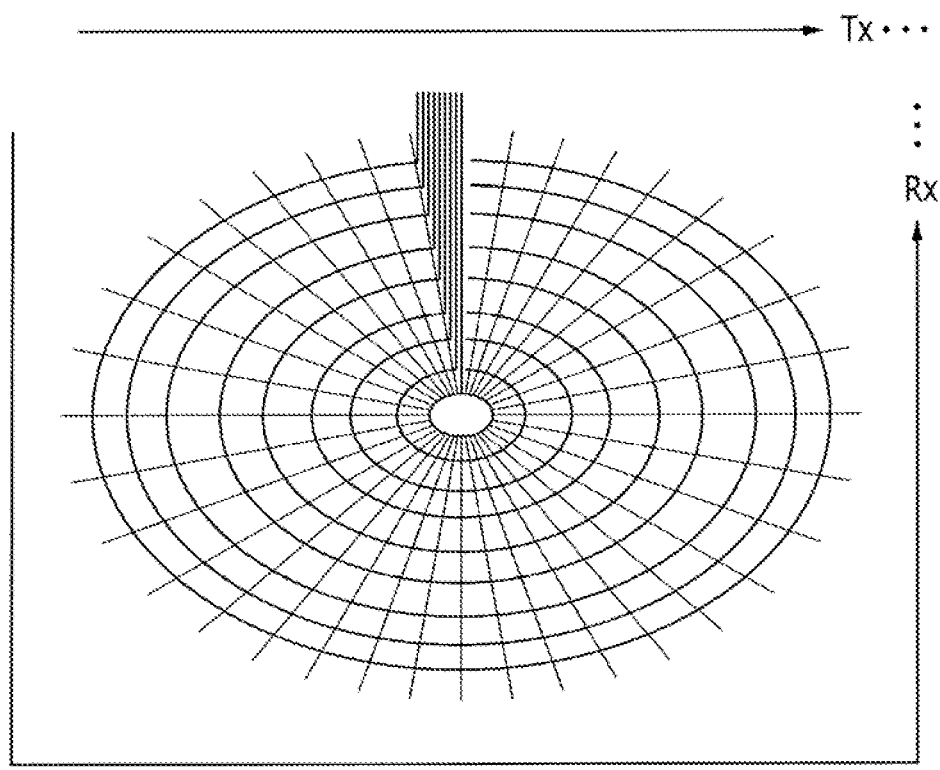
FIG. 10 is a diagram illustrating touch patterns of a minute sensing region of a touch-sensitive display device according to an exemplary embodiment of the present invention.

As illustrated in FIGS. 9 and 10, in the sensing electrodes, the plurality of first electrodes Tx is disposed in a plurality of oval shapes having different diameters and the same center point in the minute sensing region B and thus pitches between the plurality of first electrodes Tx are smaller than pitches between the plurality of first electrodes Tx in the simple sensing region A and the simple keypad region C, and thus, the number of sensor nodes per unit area in the minute sensing region B may be increased. In addition, in the minute sensing region B, the plurality of second electrodes Rx may be disposed in directions crossing the oval shapes, formed by the first electrodes Tx, with respect to the center point thereof. The plurality of oval shapes may have longer lengths than widths as illustrated in FIG. 9, and the plurality of oval shapes may have longer widths than lengths as illustrated in FIG. 10.

Although touch patterns in the simple sensing region A and the simple keypad region C are not shown in FIGS. 7 to 10, but may be substantially the same as those in the simple sensing region A and the simple keypad region C illustrated in FIGS. 5 and 6.

As described above, the patterns of the first electrodes Tx or the second electrodes Rx in the circular shapes or the oval shapes illustrated in FIGS. 5 to 10 may be selected according to a shape of the touch sensing unit and an object conductive rod) to be recognized.

Thus, by the touch-sensitive display device according to an exemplary embodiment of the present invention, the number of capacitive sensor electrodes for minute recognition such as recognition of a unique fingerprint pattern may be reduced, and thus, the touch sensing unit may be used more effectively in space and a driving circuit IC may smoothly operate.

Although the present invention has been described with reference to exemplary embodiments thereof, it will be understood that the present invention is not limited to the disclosed embodiments.

What is claimed is:

1. A touch sensing unit, comprising:
a plurality of first electrodes extended in a first direction, wherein the plurality of first electrodes is configured to sense a touch signal;
a plurality of second electrodes extended in a second direction crossing the first direction, wherein the plurality of second electrodes is configured to receive the touch signal to transmit the received touch signal to a driving circuit;
a simple sensing region;
a minute sensing region; and
a simple keypad region,
wherein
the plurality of first electrodes have a same pitch within the simple sensing region, the minute sensing region, and the simple keypad region, and the plurality of second electrodes has a first pitch within the simple sensing region, a second pitch within the minute sensing region, and a third pitch within the simple keypad region, and the first pitch is longer than the second pitch and shorter than the third pitch.

2. The touch sensing unit of claim 1, wherein:
a total number of the plurality of second electrodes is maintained by varying the pitches between the plurality of second electrodes according to a sensing region.

3. The touch sensing unit of claim 2, wherein:
a total number of sensor nodes are maintained by varying the pitches between the plurality of second electrodes according to a sensing region.

4. The touch sensing unit of claim 1, wherein:
about two hundred first electrodes and about two hundred second electrodes are formed per unit area of 9 cm$^2$ in the minute sensing region.

5. The touch sensing unit of claim 1, wherein:
about five first electrodes and about five second electrodes are per unit area of 9 cm$^2$ in the simple sensing region.

6. The touch sensing unit of claim 1, wherein:
the minute sensing region is configured to recognize a conductive rod having a diameter of about 2 mm, or a unique pattern of a fingerprint.

7. The touch sensing unit of claim 1, wherein:
the simple sensing region is configured to recognize a conductive rod having a diameter of about 6 mm.

8. A touch sensing unit, comprising:
a plurality of first electrodes extended in a first direction, wherein the plurality of first electrodes is configured to sense a touch signal;
a plurality of second electrodes extended in a second direction crossing the first direction, wherein the plurality of second electrodes is configured to receive the touch signal to transmit the received touch signal to a driving circuit;
a minute sensing region;
a simple sensing region; and
a simple keypad region,
wherein
the plurality of second electrodes have a same pitch within the simple sensing region, the minute sensing region, and the simple keypad region, and the plurality of first electrodes has a first pitch within the simple sensing region, a second pitch within the minute sensing region, and a third pitch within the simple keypad region, and the first pitch is longer than the second pitch and shorter than the third pitch.

9. The touch sensing unit of claim 8, wherein:
a total number of the plurality of first electrodes is maintained by varying the pitches between the plurality of first electrodes according to a sensing region.

10. The touch sensing unit of claim 9, wherein:
a total number of sensor nodes are maintained by varying the pitches between the plurality of first electrodes according to a sensing region.

11. The touch sensing unit of claim 8, wherein:
about two hundred first electrodes and about two hundred second electrodes are per unit area of 9 cm$^2$ in the minute sensing region.

12. The touch sensing unit of claim 8, wherein:
about five first electrodes and about five second electrodes are per unit area of 9 cm$^2$ in the simple sensing region.

13. The touch sensing unit of claim 8, wherein:
the minute sensing region is configured to recognize a conductive rod having a diameter of about 2 mm, or a unique pattern of a fingerprint.

14. The touch sensing unit of claim 8, wherein:
the simple sensing region is configured to recognize a conductive rod having a diameter of about 6 mm.

* * * * *